(12) United States Patent
LeBlanc

(10) Patent No.: US 12,699,988 B2
(45) Date of Patent: Aug. 4, 2026

(54) ELECTRONIC ESCROW SYSTEM

(71) Applicant: Gina LeBlanc, Safety Harbor, FL (US)

(72) Inventor: Gina LeBlanc, Safety Harbor, FL (US)

( * ) Notice: Subject to any disclaimer, the term of this patent is extended or adjusted under 35 U.S.C. 154(b) by 478 days.

(21) Appl. No.: 17/112,654

(22) Filed: Dec. 4, 2020

(65) Prior Publication Data

US 2021/0174348 A1 Jun. 10, 2021

Related U.S. Application Data

(60) Provisional application No. 62/943,497, filed on Dec. 4, 2019.

(51) Int. Cl.
| | |
|---|---|
| *G06Q 20/36* | (2012.01) |
| *G06Q 20/38* | (2012.01) |
| *G06Q 20/42* | (2012.01) |
| *H04L 9/06* | (2006.01) |

(52) U.S. Cl.
CPC ..... *G06Q 20/3674* (2013.01); *G06Q 20/3678* (2013.01); *G06Q 20/3829* (2013.01); *G06Q 20/425* (2013.01); *H04L 9/0656* (2013.01)

(58) Field of Classification Search
CPC ........... G06Q 20/3674; G06Q 20/3678; G06Q 20/3829; G06Q 20/425
See application file for complete search history.

(56) References Cited

U.S. PATENT DOCUMENTS

| | | | | |
|---|---|---|---|---|
| 2002/0029194 A1* | 3/2002 | Lewis | .................... | G06Q 20/10 |
| | | | | 705/40 |
| 2006/0167791 A1* | 7/2006 | Hahn-Carlson | ........ | G06Q 30/06 |
| | | | | 705/39 |
| 2017/0091699 A1* | 3/2017 | Mueller | ................ | H04W 4/023 |
| 2019/0392536 A1* | 12/2019 | Rice | ....................... | H04L 67/535 |
| 2020/0034899 A1* | 1/2020 | Castinado | .......... | G06Q 30/0609 |

* cited by examiner

*Primary Examiner* — John W Hayes
*Assistant Examiner* — Zehra Raza
(74) *Attorney, Agent, or Firm* — Bochner PLLC; Andrew D. Bochner

(57) ABSTRACT

The invention relates to an escrow system that can be between any number of parties to sell and purchase goods or services or online downloads. The system utilizes secure one-time passwords to verify that all parties have completed the terms of the contract.

6 Claims, 2 Drawing Sheets

ELECTRONIC ESCROW SYSTEM

CROSS-REFERENCE TO RELATED APPLICATION

This application claims priority from U.S. Provisional Patent Application No. 62/943,497, filed Dec. 4, 2019, titled Electronic Escrow System which is hereby incorporated by reference herein for all purposes.

BACKGROUND OF THE INVENTION

1) Field of the Invention

The invention relates to dual party and multiparty escrow transactions, and, more particularly to an electronic method of completing and closing transactions that are dependent on closing escrow based on completion of specific terms of the agreement having been met.

2) Description of Related Art

An escrow is a financial arrangement where a third party holds and regulates payment of the funds required for two or more parties involved in a given transaction such as a home, automobile, or other high value transaction. It can make transactions more secure by keeping the payment in a secure escrow account which is only released when all of the terms of an agreement are met as overseen by the escrow company.

Escrows are very useful in the case of a transaction where a large amount money is involved and a certain number of obligations need to be fulfilled before a payment is released like in the case of milestone transactions such as buying a home, purchasing a business, vehicle, electronic systems, jewelry, or hiring technologist to build a software application where the buyer wants confirmation of the quality of work being done before making a full payment, and the seller doesn't want to do the work without any assurance that they will receive payment. Traditional escrow service is quite cumbersome and requires the services of banks and lawyers. While the payment is 'In Escrow' the transaction can be safely carried out without risk of losing money or merchandise due to fraud. This eliminates all legal perils and allows for secure transactions and confident buyers and sellers.

The industry currently operates on a paper or paper like system which requires that the escrow agent releases funds to the sellers only when the purchaser has verified that all the terms of the agreement have been met.

Because of the amount of manual content in an escrow transaction, a significant cost reduction in the escrow process could be achieved.

Therefore, what is needed in the art is a robust, simple, and full featured escrow system.

BRIEF SUMMARY OF THE INVENTION

The invention in one form is directed to an online escrow system which allows both two party and multiparty transactions to occur online and facilitate a secure transfer of money based on the completion of all the agreed upon terms.

An advantage of the present invention is the utilization of a wallet and one-time tokens which allow the buyer to deposit money in their wallet and the escrow system releases the money in the buyer's wallet upon the agreed to completion of all the terms of the sale using the one-time tokens as a token to provide a secure confirmation.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
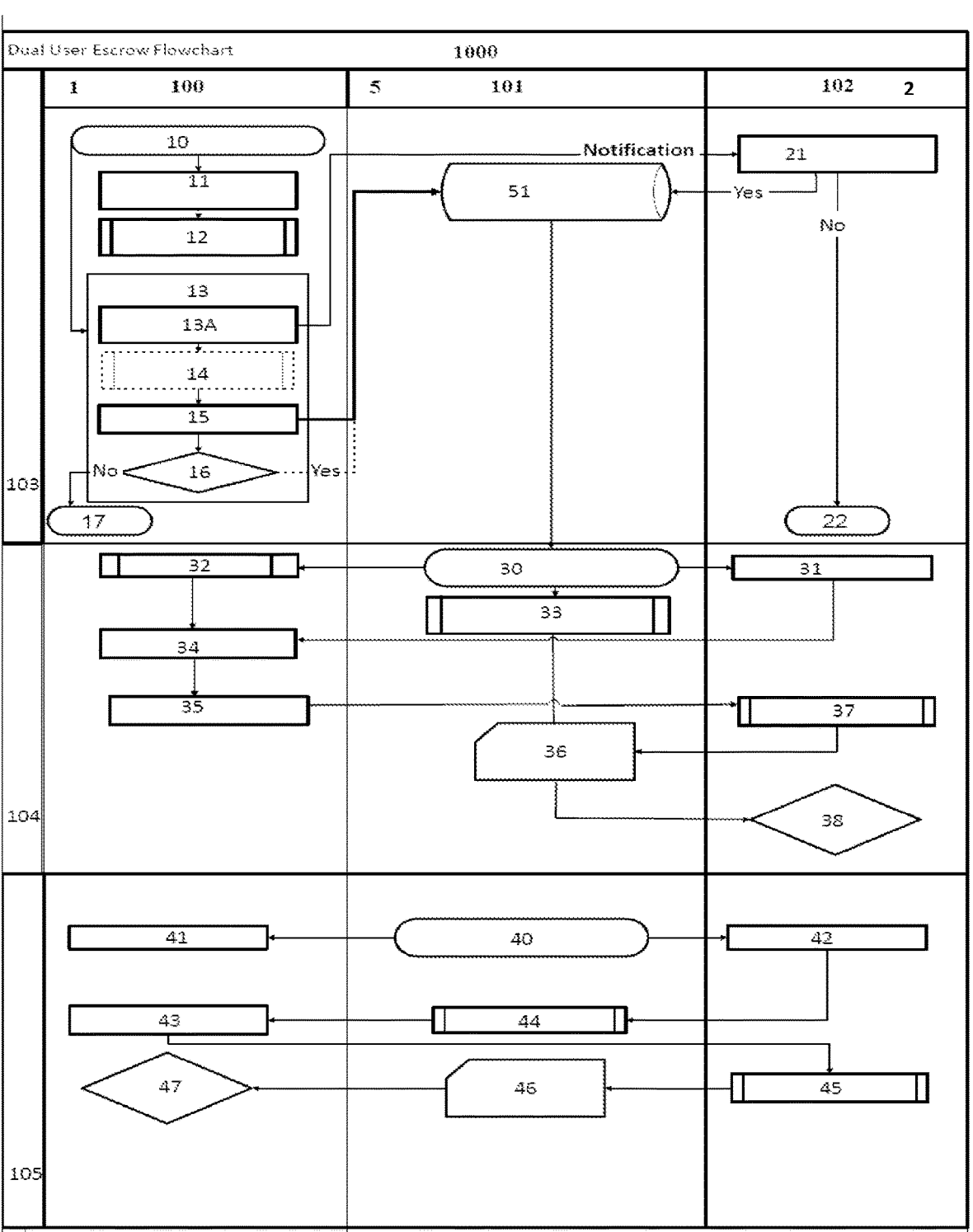
FIG. 1 is a flowchart of a dual user escrow flowchart.

Electronic payment systems have been used The prior art has numerous payment systems including U.S. Pat. No. 10,629,026 issued on Apr. 21, 2020 to Arnone, et al., U.S. Pat. No. 10,521,798 issued on Dec. 31, 2019 to Song, et al., U.S. Pat. No. 10,496,979 issued on Dec. 3, 2019 to Taveau, et al., U.S. Pat. No. 9,390,410 issued on Jul. 12, 2016 to Casares et al, U.S. Pat. No. 9,858,576 issued on Jan. 2, 2018 to Song, et al., which are hereby incorporated by reference herein for all purposes.

The terms password and passcode are used interchangeably within this specification.

The invention can be used to create an escrow-based payment that can be between either two parties or multiple parties to sell and purchase goods or services or online downloads. The term escrow is intended to mean a bond, deed, product, work product or other document kept in the custody of a third party and the transaction taking effect when a specified condition has been fulfilled. The invention may reduce the risk of fraud by acting as a trusted third-party that collects, holds and disburses funds when buyers and sellers are satisfied. The buyer and/or seller may agree to the terms of the transaction, and the invention may then act as the gate keeper to ensure that all terms of the transaction are met prior to allowing transfer of funds from the buyer or seller when applicable one-time tokens have been exchanged.

The buyer can submit a payment by an approved payment method to the buyer wallet, and the system verifies the payment. The seller may then be notified that funds have been secured in the buyer's wallet and the system moves the monies from the buyer's wallet into the system wallet. This places a control on the transaction and reduces and/or eliminates the possibility of the buyer removing the monies from the buyer wallet.

Seller completes the terms of the agreement and, upon verification that the buyer has deposited the correct amount of the funds into the buyer's wallet, the system authorizes the seller to complete their side of the agreement and submit verification of completion of terms of the transaction. Once the seller's terms have been verified, and the buyer terms have been verified, the property is released, and the money transferred to the seller's wallet from the master holding wallet. The invention uses the one-time token to verify the completion of the transaction and initiate final payment.

The escrow system can be between two parties or multiple parties to sell and purchase goods or services or online downloads. One embodiment of the invention utilizes secure one-time tokens to verify if parties have completed the terms of the contract.

Within the system the following terms are used:

Sender meaning buyer (sender of monies)

Receiver meaning seller (receiver of monies)

Sender pays/receiver pays—asking user that is initiating escrow deal who is responsible to pay for the fees to utilize the system.

User/client can be a sender or receiver and is an individual who is using the invention.

The system allows a user/client to set up an account were the personal information is stored, as well as payment information. The system allows the user/client to enter name, email, and/or phone number, address and payment methods. The system also facilitates international, individual and merchant transactions by providing a safe electronic payment system.

Escrow Days are the timeframe appointed by buyer to complete the deal and retrieve funds. For example, if doing international shipping, the system may force 14 days or more. If the deal is set to a specific length of time, for example 8 days, and is not completed within the 8 days, the escrow funds may become the system property.

The system may use any form of payment, including but not limited to, credit card, debit card payments, cash and other forms of electronic delivery such as wire transfer or PayPal and Venmo.

The system may be configured to use a code. The code may be alphanumeric, symbols or some combination of alphanumeric and symbols. The code may be of any length, preferably between 2-10 characters and more preferably 4 characters. The code is a single use, i.e., One Time Password (OTT), and may be sent by any acceptable way, including to a mobile number registered to the account, SMS text message (Short Message Service), Multimedia Messaging (MMS), email notification and messenger notifications such as Facebook messenger.

A tangible product may include any type of thing, such as commodities, devices, buildings, software, and equipment. Services may use a smart contract and may include something intangible such as management, customer service, maintenance and experiences. The system may be structured to allow for the payment of anything, including products or services.

A service may be work done by another person for another individual. For instance, a person will visit a restaurant to have the desired services performed by other people while they relax by their tables. Legal advice is another good example of a service rendered to another person by professional lawyers.

When the system refers to accept proof of delivery it may be defined by the buyer and what is acceptable to the buyer, e.g., tracking number, product/software, number or inspection. Sellers may allow buyers to retrieve documents, files, or software programs, including computer games, as a digital download. Users access a specific internet link, e.g., sent in "Remarks" field or by email, allowing them to download the document/file/program.

When the system allows a trial version, the trial version may refer to software which buyers can try before they buy. Trial versions of software usually contain all the functionality of the regular version but are typically used for a limited time.

When the system refers to a license issued/software license, it is referring to a document, physical or electronic, that provides legally binding guidelines for the use and distribution of software. Software licenses typically provide end users with the right to one or more copies of the software.

When the system refers to proof of delivery, that proof may be determined by the buyer and may include what is acceptable to the buyer, e.g., tracking number, product/software number.

The system can accommodate any number of users and/or parties to a transaction through use of One-time tokens (OTTs) assigned to each user and/or party.

For example, in a two-party escrow, there are two parties. One party is the seller and the other party is the buyer. At least one of the parties should have a system wallet. The invention refers to the system wallet as the wallet, Lock Trust wallet or LT wallet. The wallet or LT wallet allows a user to manage their money with complete accounting at one place. The LT wallet acts like a holding account for all the transactions. The wallet can have 10 or even 100 bank accounts linked to the wallet and the user/client can make payments using the LT wallet. The LT wallet allows the user/client to enter cash transactions and view monthly overview showing a complete view of all transactions. The buyer, i.e., sender, will then search for the specific seller, i.e., receiver, using the receiver's wallet ID, email or phone number. The system then verifies whose account it is, by showing the receiver's name, email, and/or phone number. The system may then assign to the sender and/or the buyer, a one-time token to the transaction. This creates a secure one-time token for the escrow transaction for each of the two parties. The one-time tokens (OTTs) for the parties are different and may be used to channel payment or change the terms of the escrow. The next action taken by the sender includes specifying funds or amount for escrow. This amount is then locked from the sender's wallet balance and transferred to the system wallet or holding account. If the sender's balance is less than what is needed, the system notifies the buyer/sender. The system may then allow the party to add money from any source, such as a credit card, automated clearing house (ACH), or wire transfer. The system may then permit the release of funds on demand if the buyer/sender is using a credit card and the balance is sufficient to cover the charge.

In some cases, the system release of the escrowed item may be delayed if the source used to add money, delays the deposit. For instance, typical ACH and wire transfers can take up to 24 to 96 hours, depending on banking time frame. Once the balance is equal to or greater than the escrow account, then the fees are also transferred to the system. The party that is paying the fees may be set by the sender, and can either be shared or paid in full by one of the parties.

Once the escrow basic terms are met, the sender will receive a secure one-time token (OTTs). After successful verification, the sender may have the ability to implement additional terms to escrow, such as an accepted proof of delivery.

The escrow is visible to the sender and the receiver once the escrow is setup and the funds are moved from sender's account to the secured master account on the system.

The buyer may then provide a one-time token to the seller once they have received the goods or services which are being transferred.

If the transaction is not completed within a specified time, the transaction may be halted, and the monies are retained by the system until the appropriate process occurs to release the money. The process for releasing the funds is defined at the initiation of the transaction by the seller or buyer and includes the following successful completion of the transaction, transaction canceled by the seller, transaction cancelled by the buyer, transaction cancelled due to inadequate funds, transaction canceled due to non-delivery of product or service, etc. The specified time may be any length of time and may be a system requirement, legal or contractual obligation, or a time agreed to by the buyer and seller.

The first one-time passcode is linked to the sending account and the escrow transaction, such that the link contains the authorization to access and send funds to the holding account, and the holding account uses the first one-time passcode to credit the funds to the escrow transaction.

The second one-time passcode linked to the receiving account and the escrow transaction such that the link contains the authorization to access the received funds from the holding account, and the holding account uses the second one-time passcode to credit the funds to the receiving account wallet from the holding account, and thereby completing the escrow transaction.

Referring now to the drawings, and more particularly to FIG. 1, there is shown a dual user escrow transaction. The system is initiated when a customer provides an email address, and creates a password, or logs in using an account such as Facebook or google and the customer fills out personal information. Personal information may include uploading proof of address and photo ID thereby providing the system with verification that the customer is the rightful owner of the account. Referring to the escrow structure of the instant invention 103. The customer can be the buyer 1 or the seller 2. The invention 1000 for dual user escrow transaction has the buyer 1 with an LT Wallet 100 and the system 1000 has LT Wallet 5 with internal functions 101 and the seller 2 has LT Wallet 102. The buyer 1 having a LT Wallet 100 creates the escrow deal 10 within the LT wallet system. The buyer 1 then adds seller 2 from his wallet using email, wallet ID or telephone number. In step 11, the buyer 1 adds Seller from his Wallet using email, wallet ID or Phone. In step 12 the buyer 1 enters the fees and escrow monies information and the Buyer verifies seller's details: name, email, and telephone number. Escrow deal Step 10 also provides information to Step 13 which has sub steps 13A, 14 and 15. Step 13A includes fees assessed/assigned to either party by buyer 1, and then notifies step 21. In step 14, buyer 1 is notified to add funds if appropriate funds are not available. In step 15 buyer 1 receives a secure code to submit the deal. In step 16, the system determines if the funds have been added to escrow. If the funds have been moved, then step 16 transfers control to step 51, monies for escrow: locked from wallet available balance. If funds have not been added, then the system ends the session step 17. If funds have been added, the system notifies the seller 2, via Step 13A, and assesses fees to seller 2 in step 21, via Step 13A. If the deal structure is accepted, then the monies for escrow in step 51 are made available to both Users in step 30. If not accepted, the session is ended step 22. In step 51, the system transfers control to the second phase which is the completed deal phase.

Referring to the complete escrow and deal section of the instant invention 104. In step 30, Escrow Deal available to both Users. The system notifies the seller 2 to deliver the goods and/or services step 31 and moves funds from the buyer's wallet to the secured master wallet, Step 33. The buyer then receives the secure one-time token in step 32. When the buyer receives Goods/Services in step 34, they send the one-time token to the seller step 35. Step 51 Monies for Escrow are available, and the monies are locked from wallet available balance.

When the seller is notified that the escrow deal is available in step 30 then the seller can deliver the goods or services step 31. The buyer 1 then sends their one-time token to the seller in step 35 and the buyer's one-time token is received by the seller 2 in step 37 so that the seller 2 can claim the funds using the seller's one-time token in step 36. Step 33 provides the funds for step 36 from the secured master wallet. When the funds have been received by the seller 2, the system closes the escrow in the funds received in step 38.

Referring to the cancel escrow and deal section of the instant invention 105. Phase 2: Cancel Deal, begins with the step 40. The escrow deal is available to the users. The buyer 1 receives a secure one-time token step 41 and the seller decides to cancel step 42. The buyer will receive the notification and the one-time token to cancel the transaction from the system step 44 and the buyer agrees to cancel and sends the one-time token to the seller 2 step 43. Step 43 transfers control to step 45 and the seller 2 submits the buyer's one-time token to release the monies in the secure master wallet step 45. The buyer then claims funds using the one-time tokens from the seller step 46 and the buyer 1 receives the funds step 47. The one-time tokens allow the buyer and/or the seller to confirm that a transaction is agreed to by the parties.

Figure 2:
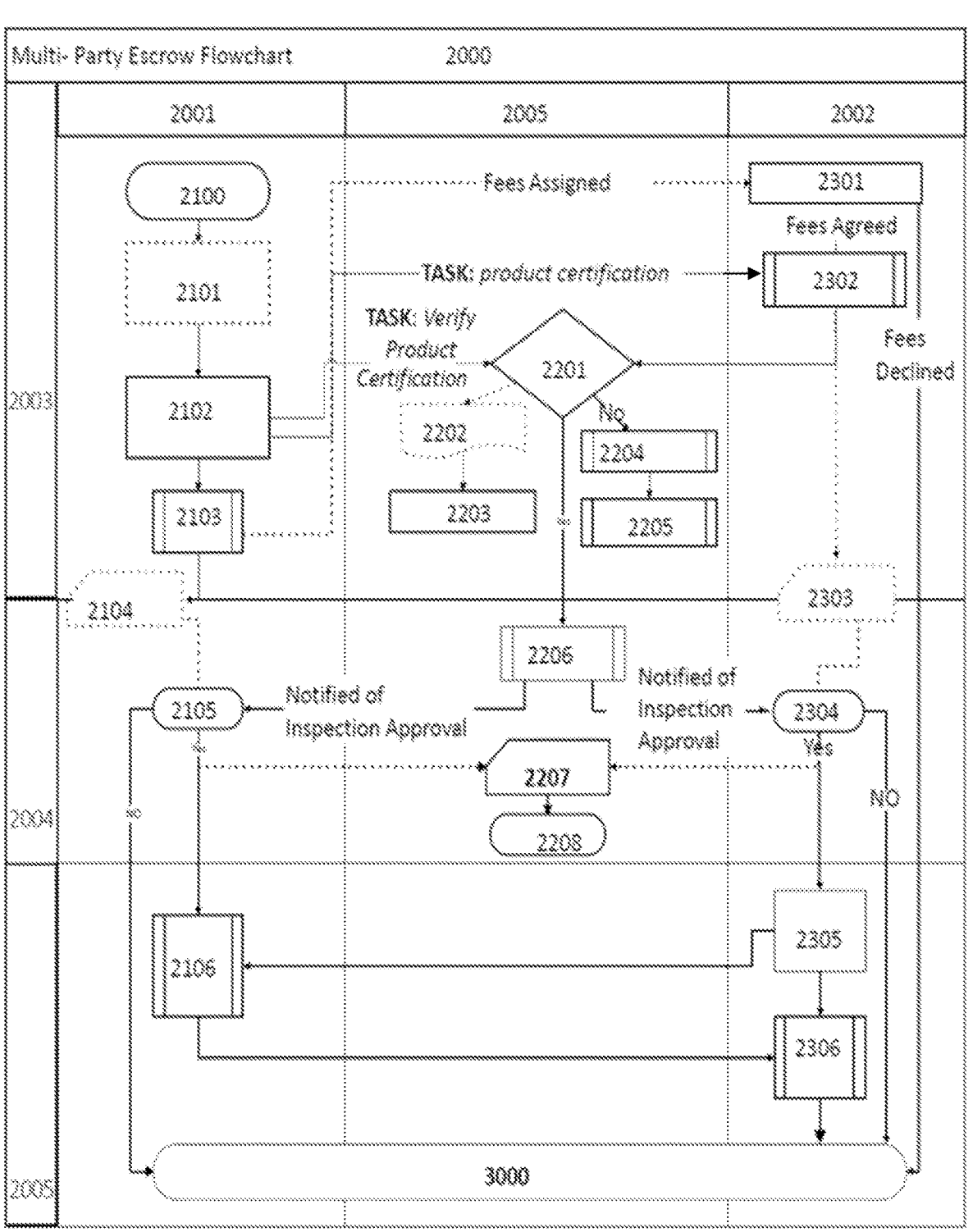
FIG. 2 is a flowchart of a multi-party escrow.

Referring now to FIG. 2, there is shown a multi-party escrow process. If the process is a multi-party escrow, the buyers initiates a multi-party escrow process step 2000. The buyer 2001, multi-party 2005 and the seller 2002. Step 2100 the buyer 2001 initiates the escrow deal within the wallet. Step 2101, the buyer 2001 provides multi-parties 2005 email address(es) and phone number(s) for the one-time tokens. Step 2102, the buyer 2001 assigns a task and verification process. Step 2103, the buyer assigns the fees and fee split if any. For example, the buyers can assign a percentage of the fee to either the buyer or seller as long as the percentage adds up to 100%. An example is the seller 2002 pays 60% of the fees and the buyer 2001 pays 40% of the fees. Fee percentage may be split in any percentage but should generally equal 100% when added together. The system then transfers the fees and escrow funds from the available wallet to the secure master wallet step 2104. When the deal is approved in step 2105, the system sends the one-time token to the seller step 2106 and the seller uses the buyer's one-time token step 2306 to retrieve the funds and the deal is complete step 3000. If the deal is not approved in step 2105 the system transfers control to step 3000 and the deal is complete.

Step 2102 can also transfer control to step 2201 where the product is verified that it meets the specification. This allows the uploading of the relevant files step 2202 and the appraising of goods pricing which is optional step 2203. Step 2201 also submits the one-time tokens to step 2206 which feeds them to step 2304 and step 2105. Step 2105 also sends a notification that the fees remitted to the third party 2005, which was assigned the task to validate the product. In step 2207, the system sends a notification that the fees have been remitted and completes the third-party assignment step 2208.

Referring to Phase 1 step 2003, steps 2102 and 2103 provide input for step 2301 which is the processing of the fees. The fees are assigned and if the fees are processed and agreed to successfully, the product is made available step 2302 to the third party 2005. This provides the notification to step 2201 and the system notifies and withdraws the fees from the available wallet step 2303 and the deal is approved in step 2304. If the fees are declined, then at step 2301, control is transferred to deal complete step 3000.

Step 2102 can also send information to step 2201 such as the verify product certification. Step 2201 is the product verification which certifies that the product meets specification Step 2102 also provides product certification to step 2302.

Step 2201 is the product verification and it assembles the certification that the product meets the agreed to specifications. Step 2201 can upload relevant files step 2202, which can provide the buyer an optional appraisal of goods pricing step 2203. Step 2201 can also notify buyer and seller of the specification certification step 2204 and notify the buyer and seller of decreased escrow amount 2205. If the product meets specifications, step 2201 transfers control to step 2206 and the system submits the one-time token to the seller. Referring to Phase 2 step 2004. A unique aspect of the invention is that step 2206 can transmit the notification that the inspection has been approved to steps 2304 approve deal and step 2105 approve deal. If the deal is not approved, then step 2105 will transfer control to step 3000 deal complete. Referring to Phase 3 step 2005, if the deal is approved step 2105 sends the one-time token to the seller step 2106 and remits the fees to the third-party step 2207 which then completes the third-party activity step 2208.

Step 2016 also receives input from step 2305 which is the initiation to ship the goods which receives it's input to ship goods from step 2304, which is the deal is approved. However, if the deal is not approved, step 2304 transfers control to deal complete step 3000. Step 2305 also provides input so that the seller can use the one-time token to retrieve funds step 2306. Which triggers the deal complete step 3000.

It should be understood that while the description generally discusses a single seller and a single buyer, the system may include any number of interested parties. The interested parties may include any individual and/or any entity with an interest in the contract. Furthermore, it is to be understood that regardless of the number of parties, the system is configured to issue one-time tokens to each party as needed to complete the transaction.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of managing an escrow transaction using an electronic payment system for a multi-party sale contract for a product, and using at least one one-time passcode issued by the electronic payment system so that said electronic payment system is limited to processing only authorized transactions, the method being executed by an online escrow system comprising at least one sending account, at least one receiving account, and a holding account, the method comprising:

a. a user logs into said electronic payment system using an email address, and a password, the user being an owner of the at least one sending account, and said user then creating the escrow transaction in the at least one sending account on said electronic payment system, the escrow transaction having at least one term and at least one payment related to said sale contract having at least one buyer, at least one third-party, and at least one seller, and said sale contract having a value based on funds in said sending account;

b. said user then using said electronic payment system adding the at least one receiving account to the at least one sending account on said electronic payment system to the sale contract, the at least one receiving account having at least one email, a receiving wallet identification and a phone number, wherein said receiving wallet identification is bound to said escrow transaction at creation;

c. said user then using said electronic payment system adding at least one third-party account to the at least one sending account to the sale contract, the at least one third-party account having at least one email, a third-party wallet identification, and a phone number;

d. said sending account on said electronic payment system setting a first fee;

e. said sending account on said electronic payment system setting a third-party fee;

f. said receiving account on said electronic payment system confirming said first fee;

g. said receiving account on said electronic payment system confirming a third party-fee;

h. said first fee and said third-party fee being added to said sale contract value by said electronic payment system;

i. said electronic payment system making available the product to said third-party;

j. said third-party validating the product;

k. said electronic payment system verifying the at least one sending account has sufficient funds greater than or equal to said contract value of said sale contract;

l. the at least one third-party account on said electronic payment system having at least one third-party email, a sending wallet identification and a third-party phone number;

m. the at least one sending account on said electronic payment system having at least one sending account email, the sending wallet identification and the phone number;

n. said electronic payment system verifying the at least one sending account has sufficient funds for said sale contract and that fees in steps (d)-(g) are accepted;

o. said electronic payment system notifying that an inspection has been approved;

p. said third-party performing a verification, the verification certifying whether all the terms of the said sale contract have been fulfilled, and the electronic payment system storing a verification certification associated with the escrow transaction, the verification certification comprising at least one file upload selected from: a tracking number, a product or software identifier, or an inspection report;

q. said electronic payment system notifying the buyer and the seller of the results of the verification certification, and when the verification certification indicates an adjustment to the sale contract value, adjusting the escrow amount accordingly and notifying the buyer and seller of an adjusted escrow amount;

r. said electronic payment system notifying the at least one receiving account of the escrow transaction using said receiving account email;

s. said electronic payment system notifying the at least one sending account of the escrow transaction using said sending account email;

t. said electronic payment system generating a first one-time passcode linked to said sending account and an escrow transaction only after completion of steps (f)-(n) such that said first one-time passcode contains the authorization to access and to send funds only from the sending account to the holding account and said sending account on said electronic payment system receiving said first one-time passcode for transferring the payment, the first one-time passcode being single-use and delivered to at least one registered contact channel selected from SMS, MMS, and email;

u. said electronic payment system transferring the payment for said sale contract value from the sending account to a holding account using said first one-time passcode to access said sending account, wherein upon said transfer the monies are locked from the sending account's available balance and the holding account is programmatically restricted from permitting any debit operation other than (i) release of escrowed funds to the receiving account authorized by a valid second one-time passcode for the escrow transaction and (ii) transfer of the third-party fee to the third-party account;

v. said holding account on said electronic payment system accepting the escrow transaction;

w. said electronic payment system generating a second one-time passcode linked to said receiving account and an escrow transaction only after the verification certification in step (p) is stored and while escrow days remain such that said second one-time passcode contains the authorization to access and to send funds only from the holding account to the receiving account identified in the escrow transaction and matching the receiving wallet identification bound in step (b), the second one-time passcode being single-use;

x. said electronic payment system sending the second one-time passcode to the receiving account via at least one of the registered contact channels;

y. said receiving account on said electronic payment system claiming the payment from the holding account using the second one-time passcode, and the electronic payment system rejecting any claim attempt using the second one-time passcode from a second receiving account whose second receiving wallet identification does not match the receiving wallet identification bound in step (b);

z. said holding account on said electronic payment system sending a notice that the escrow transaction is complete to said third-party at least one email; and aa. said electronic payment system transferring said third-party fee to said third-party account from said holding account;

ab. when escrow days elapse prior to step (y), said electronic payment system refraining from issuing the second one-time passcode and initiating a cancellation flow by transmitting a cancellation one-time passcode to the buyer, the cancellation one-time passcode authorizing return of funds from the holding account to the sending account; and ac. said electronic payment system recording escrow state transitions, passcode issuance events, and notifications in a user wallets' transaction history.

2. The method of claim 1 wherein said holding account is associated with said escrow transaction wherein the association includes at least one term and at least one payment related to said sale contract and said sale contract having a value based on funds in said sending account.

3. The method of claim 1 wherein said holding account can be accessed by said first one-time passcode to deposit funds and a second one-time password to withdraw funds and said first one-time password is unique to said escrow transaction and said second one-time password is unique to said escrow transaction.

4. The method of claim 1 wherein said first one-time passcode is linked to said sending account and said escrow transaction such that said first one-time passcode contains the authorization to access to send funds to said holding account and said holding account uses the first one-time passcode to credit the funds to said escrow transaction.

5. The method of claim 1 wherein said second one-time passcode is linked to said receiving account and said escrow transaction such that said second one-time passcode contains the authorization to access to receive funds from said holding account and said holding account uses the second one-time passcode to credit the funds to said receiving account wallet from said holding account and completing the escrow transaction.

6. The method of claim 1 wherein said first fee comprises a receiving account fee and a sending account fee.

* * * * *